United States Patent
Chintala et al.

(10) Patent No.: US 7,860,993 B2
(45) Date of Patent: Dec. 28, 2010

(54) STREAMING MEDIA CONTENT DELIVERY SYSTEM AND METHOD FOR DELIVERING STREAMING CONTENT

(75) Inventors: Ajay Kumar Chintala, Irving, TX (US); Thomas Renfer Kee, Plano, TX (US)

(73) Assignee: Yahoo! Inc., Sunnyvale, CA (US)

(*) Notice: Subject to any disclaimer, the term of this patent is extended or adjusted under 35 U.S.C. 154(b) by 314 days.

(21) Appl. No.: 11/094,055

(22) Filed: Mar. 30, 2005

(65) Prior Publication Data

US 2006/0230170 A1    Oct. 12, 2006

(51) Int. Cl.
G06F 15/16 (2006.01)
(52) U.S. Cl. ............... 709/231; 709/214; 709/223
(58) Field of Classification Search ............. 709/203, 709/217, 219, 224, 231, 223
See application file for complete search history.

(56) References Cited

U.S. PATENT DOCUMENTS

| | | | |
|---|---|---|---|
| 6,253,375 B1 * | 6/2001 | Gordon et al. ............... 725/88 |
| 6,631,451 B2 * | 10/2003 | Glance et al. ............... 711/158 |
| 2003/0055910 A1 * | 3/2003 | Amini et al. ............... 709/214 |
| 2003/0191840 A1 * | 10/2003 | Maciel ............... 709/226 |
| 2003/0217113 A1 * | 11/2003 | Katz et al. ............... 709/213 |
| 2004/0225728 A1 * | 11/2004 | Huggins et al. ............... 709/223 |
| 2005/0060316 A1 * | 3/2005 | Kamath et al. ............... 707/9 |
| 2005/0226532 A1 * | 10/2005 | Thompson et al. ............... 382/286 |
| 2006/0059223 A1 | 3/2006 | Klements et al. |
| 2006/0075082 A1 * | 4/2006 | Haga et al. ............... 709/223 |

* cited by examiner

*Primary Examiner*—Barbara N Burgess
(74) *Attorney, Agent, or Firm*—James J. DeCarlo; Greenberg Traurig, LLP

(57) ABSTRACT

A method for delivering streaming media files to a plurality of end users from a streaming media delivery system including a filer for storing the media files and a streaming server for serving the media files generally includes the steps of monitoring demand for the streaming media files, identifying at least one of the streaming media files to be cached when demand for the at least one of the streaming media files reaches a pre-defined threshold, copying the streaming media file to a streaming server from a media storage device, and streaming the streaming media file using the copy stored locally on the streaming server.

29 Claims, 7 Drawing Sheets

STREAMING MEDIA CONTENT DELIVERY SYSTEM AND METHOD FOR DELIVERING STREAMING CONTENT

BACKGROUND OF THE INVENTION

1. Field of the Invention

The present invention is in the field of streaming media delivery and, in particular, to an improved system and method for managing the resources of a streaming media system in response to user demand.

2. Description of the Related Art

The streaming of media content over a network, such as the Internet, is well known in the art. The streaming of audio content, such as music, or video content, such as live newscasts and the like, is most prevalent. In order to stream recorded video or audio, the video or audio file must be encoded into a streaming media format. Once the content has been encoded, it can be streamed from a live source or from a storage device.

Typically, in streaming media systems, the streaming content is uploaded to and stored on one or more storage devices. These storage devices are commonly referred to as filers and are generally high capacity optical disks capable of storing a large amount of data. To facilitate organization of the content stored on the filers, filers may be broken down into volumes and shares. The content is located on the share through use of a file path or publishing point. Streaming servers are capable of communication with the filers. Upon a request for on-demand content (i.e., archived content as opposed to live streaming content), the streaming server streams the content to the media player operating on the requesting user's computer.

In such streaming systems, a web page will include a link or uniform resource locator (URL) pointing directly to the streaming media content or will contain a URL identifying the streaming content to the streaming server. In other instances, a streaming redirector file, such as an "ASX" or "RAM" file can be used to identify two or more content files to the streaming servers. In all cases, when the URL is selected or clicked, the user's media player uses the path to identify the requested streaming media to the streaming servers, which in turn located the streaming media on the filers. The streaming media is then streamed to the user's computer via the media player as is well known in the art.

In high demand situations, such as when a popular piece of content is being accessed at a high rate, the bandwidth of the streaming system, i.e., the network connections between the filers, the streaming servers, and the end users, can become overloaded. Such situations can cause interruptions in the streaming of the content thereby resulting in a poor user experience. The solution in most instances is to increase the bandwidth and processing power of the various streaming media components. This solution, however, can add significant cost and may become unnecessary when demand for streaming content subsides.

Consequently, there is a long felt, but unresolved, need for a system and method that reduces streaming interruptions and thereby improves the streaming experience for the end user.

SUMMARY OF THE INVENTION

According to an embodiment of the present invention, a stream caching process that operates on the streaming servers of a streaming media delivery system monitors the demand for streaming content and caches high-demand streaming content on one or more streaming servers.

In general, a streaming media delivery system comprises a filer storing a plurality of streaming media files. The filer is capable of communication with a streaming server. The streaming server, in turn, is capable of communication with one or more end user computers. A caching process is operative on the streaming servers to monitor the demand for streaming media files. When the demand for a particular streaming media file reaches a threshold, the caching process copies the streaming media file to the streaming server. The streaming media file will thereafter be streamed directly from the streaming media server to the end user computer.

By caching the high-demand streaming media file on the streaming servers, file read latency at the streaming server level and interruptions in the stream are significantly reduced. Additionally, the dependency on the central storage servers (or filers) is reduced. Moreover, the caching process reduces the need to purchase and implement high capacity filers by reducing the number of operations per second performed on the filers. Furthermore, the amount of internal network traffic between the streaming servers and filers is reduced, thereby reducing the need to increase internal network infrastructure. Consequently, the quality of the streaming experience for the end user is increased and the costs for the provider associated with delivery streaming content reduced. Additional features and advantages of the system are described further below.

DETAILED DESCRIPTION OF THE EMBODIMENTS

With reference to FIGS. 1-4, an embodiment of a present invention will be shown and described. Generally speaking a method for stream caching comprises monitoring demand for one or more streaming media files, identifying a streaming media file to be cached when demand for the streaming media file reaches a pre-defined threshold expressed as a percentage of the total traffic received by that streaming server with in a given interval, copying the streaming media file to a streaming server from the media storage device, and streaming the streaming media file using the copy stored on the streaming server.

System Architecture

Figure 1:
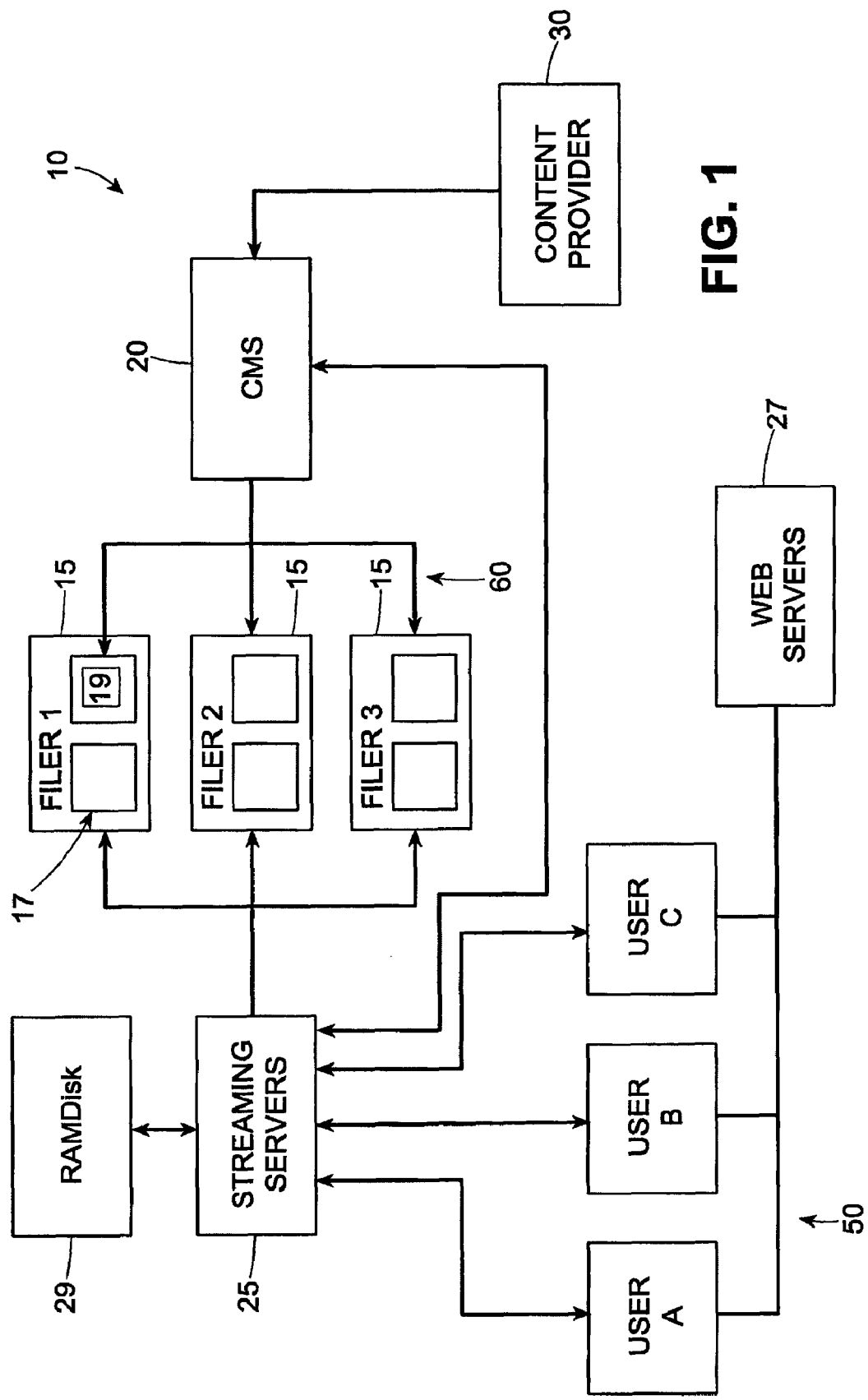
FIG. 1 is a schematic block diagram of the system architecture of a streaming media delivery system in accordance with an embodiment of the present invention.

With reference now to FIG. 1, there is shown an illustrative system architecture for use with the stream caching method of the present invention. A streaming media delivery system 10 comprises one or more filers 15 that are used to store streaming media content. The filers 15 are storage devices that are partitioned into a plurality of volumes 17. Each volume 17 on the filer 15 further includes one or more shares 19. Based on the size of the streaming media content to be stored and the relative disk space on a particular filer 15, the streaming media file is placed into a particular share 19 on a volume 17 of the filer 15.

The filers 15 are capable of communication with a content management system 20 via a network 60 such as a local area network or a wide area network. The content management system 20 receives content from a content provider 30 and stores the content (e.g., a streaming media file) on the filers 15. An example of a content management system for use with the streaming media delivery system 10 of the present invention is described in U.S. Published Application No. US2004/0083273 A1, published on Apr. 29, 2004, the entire disclosure of which is incorporated herein by reference.

The filers 15 are also capable of communication with one or more streaming servers 25, which are used to stream content to one or more users, and may further be capable of communication with one or more RAMDisks 29 and RAID controlled hard drives 28, which may also be used to stream content, as further described below. As was also disclosed in U.S. Published Application No. US2004/0083273 A1, the streaming servers 25 store stream related information, including stream identifiers (IDS) and paths to the streaming media content on the filers 15, so as to stream selected content to users. Filers 15 are any type of mass storage devices capable of storing large amounts of data in an organized fashion, such as known data storage devices including, but not limited to hard disks, tape drives, optical disks and the like. The filers 15 are preferably partitioned into volumes 17, which are in turn sectioned into shares 19. The streaming media files can then be organized on the shares 19, which reduces response time when a file is retrieved by the streaming server 25.

It should also be noted that although the streaming media delivery system 10 of the present invention is described herein in connection with a system that utilizes Microsoft Windows Media Player 9 streaming servers, persons of skill in the art will recognize that the stream caching system and process of the present invention can be used with other types of streaming server technologies and also on web servers where the files to be served are stored on remote storage devices.

End user computers 50 are any type of personal or network computer such as an IBM-compatible computer running an Intel chipset and having an operating system, such as Microsoft Windows NT, 2000, XP, and the like, and, preferably, running a browser program such as Microsoft Internet Explorer or Netscape Navigator. Preferably, the end user computers 50 also include software for playing streaming media files. Examples of such software include Windows Media Player 9, Real Networks RealPlayer 10, and Apple QuickTime 6.1. It is also within the scope of the present invention that end user computers 50 may be handheld or table computing devices, such as a personal digital assistant (PDA), pocket PC, and tablet PC, or the like. The end user computers 50 also preferably have access to a communications network via a modem or broadband connection to permit data communication between the end user computers 50 and the streaming servers 25 of the streaming media delivery system 10.

Various input and output devices are also preferably provided with the end user computers 50 including, by way of non-limiting example, a display (e.g., cathode ray tube (CRT), liquid crystal display (LCD), etc.), and an input device (e.g., a keyboard, mouse, touch pad, or light pen). The end user computers 50 would also preferably include a storage device such as, for example, a magnetic disk drive and magnetic disk, a CD-ROM drive and CD-ROM, DVD, or other equivalent device. The specific hardware combination/configuration is not crucial to the instant invention, and may vary as a matter of design choice within the functional parameters disclosed herein.

Moreover, persons of skill will recognize that multiple streaming servers 25 in a server farm arrangement may be utilized to handle the bandwidth and processing requirements of a particular arrangement of the present invention. Similarly, multiple filers 15 may be used to handle the storage of the streaming content as a matter of design choice. Further, various load balancing techniques may be used to distributing traffic among the streaming servers 25 in a streaming server farm. For example, clustering may be used to manage the server workload so that it is evenly distributed among the streaming server nodes. A round robin technique may be used to balance the load of requests to a particular streaming server.

In a preferred embodiment, as shown in FIG. 1, the streaming media delivery system 10 includes a SCSI hard drive with a RAID controller which serves as the primary location for the caching of stream files. RAMDisk 29 is any random access memory (RAM), such as, for example, dynamic RAM (DRAM) or static RAM (SRAM), programmed to function as a disk drive. RAMDisks may be used alone or in combination according to design choice.

With reference again to FIG. 1, a plurality of end users can request streaming content from the streaming media delivery system 10 via end user computers 50. The end users generally interact with a website that is provided by one or more web servers 27 of the content provider. The websites may contain one or more links to streaming media content. The links or URLs identify an item of streaming media content by a stream identifier. The stream identifier is preferably any alphanumeric code that is unique to a streaming media file. An example of such a link is shown in Table I below:

TABLE I

| Streaming Protocol | Streaming Server | Publishing Point | Stream Path |
|---|---|---|---|
| mms:// | streamcontent15.bcst.yahoo.com | pubpt6 | pubshare22/LAU97/7/123456.wma?StreamID=123456&b=824499t03ckhb412ce98b&ru=MozillaMSIE |

As can be seen in Table I above, the link also includes a query string that includes the stream identifier, in the example "123456." The streaming servers 25 use the information in the link to locate the requested stream. In the present embodiment, because the stream may be cached on one of the streaming servers 25 or, alternatively, stored on a network filer 15, the streaming server 25 first determines whether the stream is on the streaming server 25. If it is not, then the streaming server 25 retrieves the stream from one of the network filers 15.

The Stream Caching Process

In an embodiment of the present invention, the stream caching process is performed by a software plug-in that is operable on the streaming servers 25 of the streaming media delivery system 10. The stream caching plug-in preferably includes four main components: a content mapping component, a cache management component, a publishing point component, and a network share checking component. The four components are preferably configured as dynamic link libraries (DLL). As is known in the art, the dynamic link library or DLL is a library of executable functions and data that can be called to carry out a desired procedure on a computer system. In general, the content mapping component is executed to retrieve the path of cached streaming files. The cache management component, which is called by the content mapping component, is responsible for caching high demand streaming files on the streaming servers 25. The publishing point component is executed to query the content management system 20 for the publishing points that are cached in the streaming server memory. The network share checking component is executed to monitor the availability of the shares 19 on the filers 15 and for flagging the shares 19 as inaccessible when appropriate.

The publishing point component executes a procedure that queries the content management system 20 at defined intervals to retrieve updated publishing point information from the content management system 20. In a preferred embodiment, the publishing point information is messaged using the Extensible Mark-up Language (XML), as shown in Table II below:

TABLE II

```
<PUBLISHINGPOINTS INTERVAL-SEC="300">
<MISSINGFILE
PATH="C:\BroadcastServices\WMPlug\WMRoot\FileNotFound.wma" />
<INVALIDPUBLISHINGPOINT
PATH="C:\BroadcastServices\WMPlug\WMRoot\StorageOffline.wma" />
<PUBLISHINGPOINT NAME="bmfroot01"
PATH="\\bmf.bcst.yahoo.com\bmfroot01" />
<PUBLISHINGPOINT NAME="bmfroot03"
PATH="\\bmf.bcst.yahoo.com\bmfroot03" />
<PUBLISHINGPOINT NAME="bmfroot04"
PATH="\\bmf.bcst.yahoo.com\bmfroot04" />
<PUBLISHINGPOINT NAME="bus01root4"
PATH="\\bus01.bcst.yahoo.com\busroot4" />
        :
        :
        :
</PUBLISHINGPOINTS>
```

By retrieving the publishing point information, the streaming servers 25 can retrieve a publishing point for each filer share path that is mapped to the publishing points. The network share checking component can then be executed to check each publishing point path for its health and connectivity so as to ensure that each publishing point is valid and working. To accomplish this, the network share checking component executes a procedure that attempts to connect to the publishing points path. If the connection procedure is not successful in connecting to the share 19 that is pointed to by the publishing point, then the network share checking component flags the publishing point as inaccessible and no streaming traffic will be pushed to that particular filer share 19. Because the network share checking component is executed frequently to check the health of the publishing point paths, it is preferred that the connection procedure be completed in about 1,800 milliseconds, so as to reduce the bandwidth impact of the share checking procedure. Thus, if the network share checking component cannot successfully connect to the publishing point within about 1,800 milliseconds, then the publishing point will be flagged as inaccessible. Persons of skill in the relevant art will recognize that time limits other than 1,800 milliseconds may be utilized as a matter of design choice.

Figure 2:
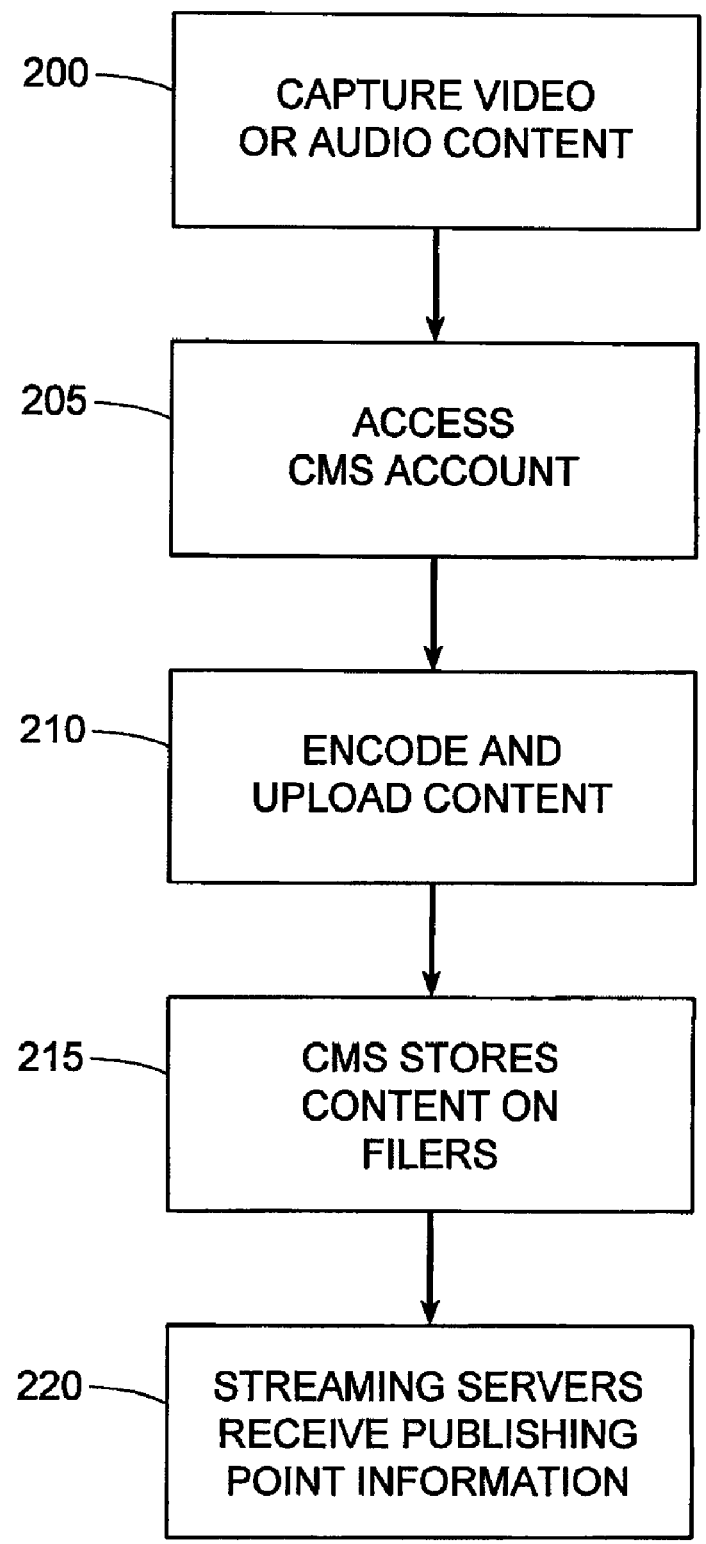
FIG. 2 is an illustrative process flow for uploading streaming media content to the streaming media delivery system.

With reference now to FIG. 2, an illustrative process for uploading content to the streaming media delivery system 10 will be shown and described. In Step 200, a content provider 30, which may be the operator of the streaming media delivery system 10 or a third party content provider 30, captures video or audio content. The content provider 30 can then encode the content into a streaming media format or upload the content directly to the content management system 20 of the streaming media delivery system 10 (step 210). In either case, the content provider 30 accesses the content management system 20 of the streaming media delivery system 10 (step 205). An example of a content management system 20 that can be used in connection with the present invention is disclosed in U.S. Published Application No. US2004/0083273 A1, the entire disclosure of which is incorporated herein by reference. Using the content management system 30, the content provider 30 uploads the streaming media content whether already encoded or in its native form. If the streaming media content is not encoded, then the encoding process can be performed at the content management system 20. In step 215, the content management system 20 stores the content on specified shares on the filers of the streaming media delivery system 10. The content management system 20 then records a publishing point for the stored content and forwards the publishing point information to the streaming servers 25 (step 220).

Figure 3A:
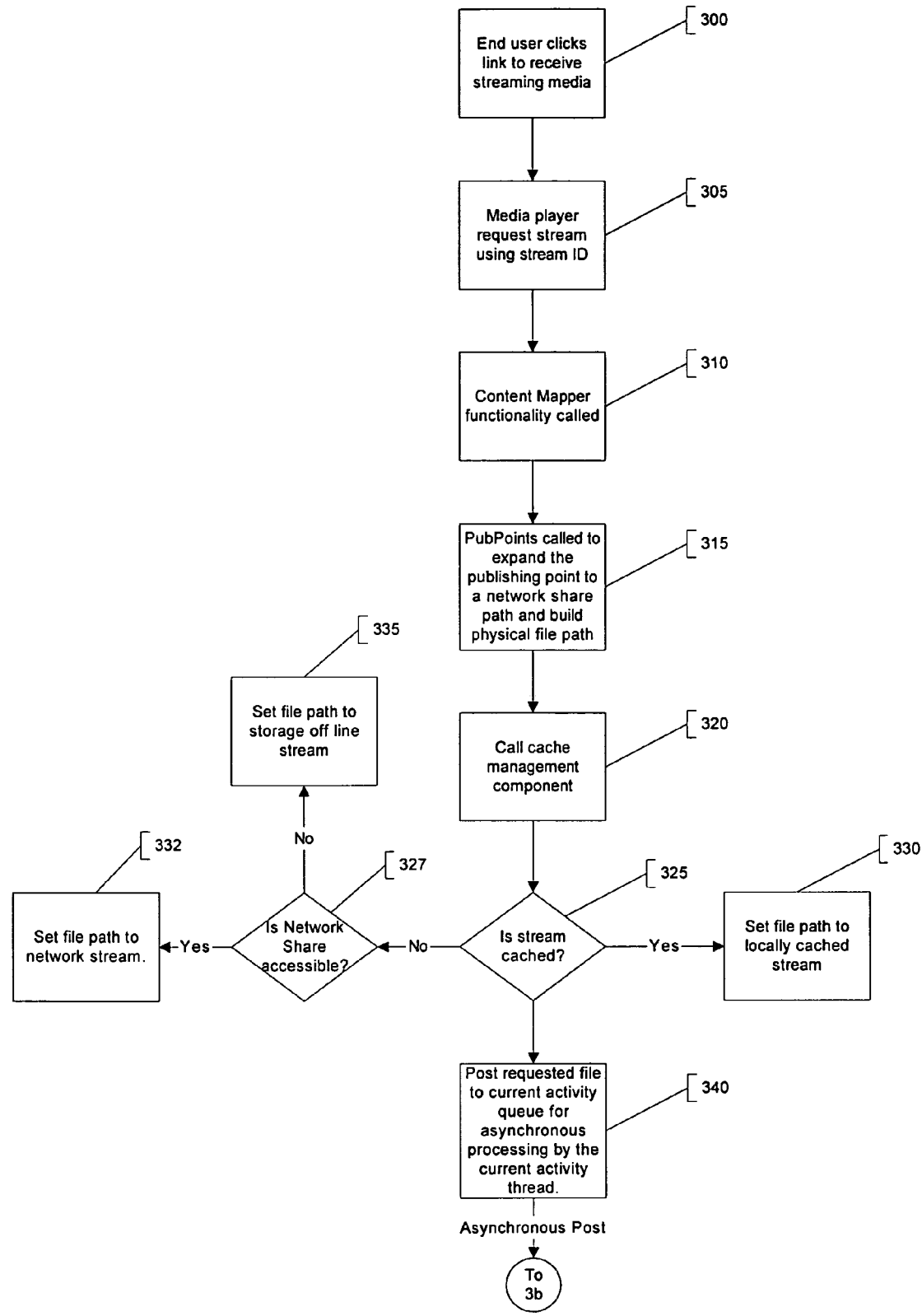
FIGS. 3*a* and 3*b* depict an illustrative process flow for caching streaming media content on the streaming servers of the streaming media delivery system.

Turning now to FIG. 3a, an illustrative process for caching high demand streams will be described. As described above, in Step 300, an end user accessing a webpage that includes links to streaming media content can select a link to request streaming media content from the streaming media delivery system 10. In Step 305, the media player operative on the end user's computer 50 makes a call to the streaming servers 25 using the stream ID embedded in the URL clicked by the user. In Step 310, the stream caching plug-in software operative on the streaming servers 25 executes the content mapping component. In step 315, the content mapping component passes the stream ID and the stream file path to the caching component which returns the cached path if the stream identified by the stream ID has been cached. More particularly, in a preferred embodiment, the PubPoints component is called to expand the publishing point to a network share path and build a physical path. The content mapping component then makes a call to the cache management component in step 320. The cache management component, in step 325, accesses read only data in tabular format to determine whether the requested stream ID is listed in the data table, e.g., whether the stream is cached. An example of such a data table is shown below in Table III.

TABLE III

| Stream ID | Cached Path |
|---|---|
| 123456 | E:\plugincache\pub01.bcst.yahoo.com\proot6\pubshare22\LAUapwm9\5\123456.wma |
| 123457 | E:\plugincache\pub01.bcst.yahoo.com\proot6\pubshare22\LAUapwm9\5\123457.wma |
| 123458 | E:\plugincache\pub01.bcst.yahoo.com\proot6\pubshare22\LAUapwm9\5\123458.wma |

If the stream ID that is requested by the user is not found in data table, then the cache management component returns a false value, and the content mapper component then checks for accessibility of the publishing point share in step 327. If the network share is accessible, then the path is set the network path in step 332. If the share is not accessible, then a message indicating an invalid publishing point is returned, and then file path is set to storage off-line stream, in Step 335. However, if the cache management component finds the stream ID in the data table, then the local cached path, as shown in Table III, is retrieved from the data table for the particular stream ID, in step 330. In step 340, the requested file is posted to the current activity queue for a synchronous processing by the current activity thread of the cache management component.

Figure 3B:
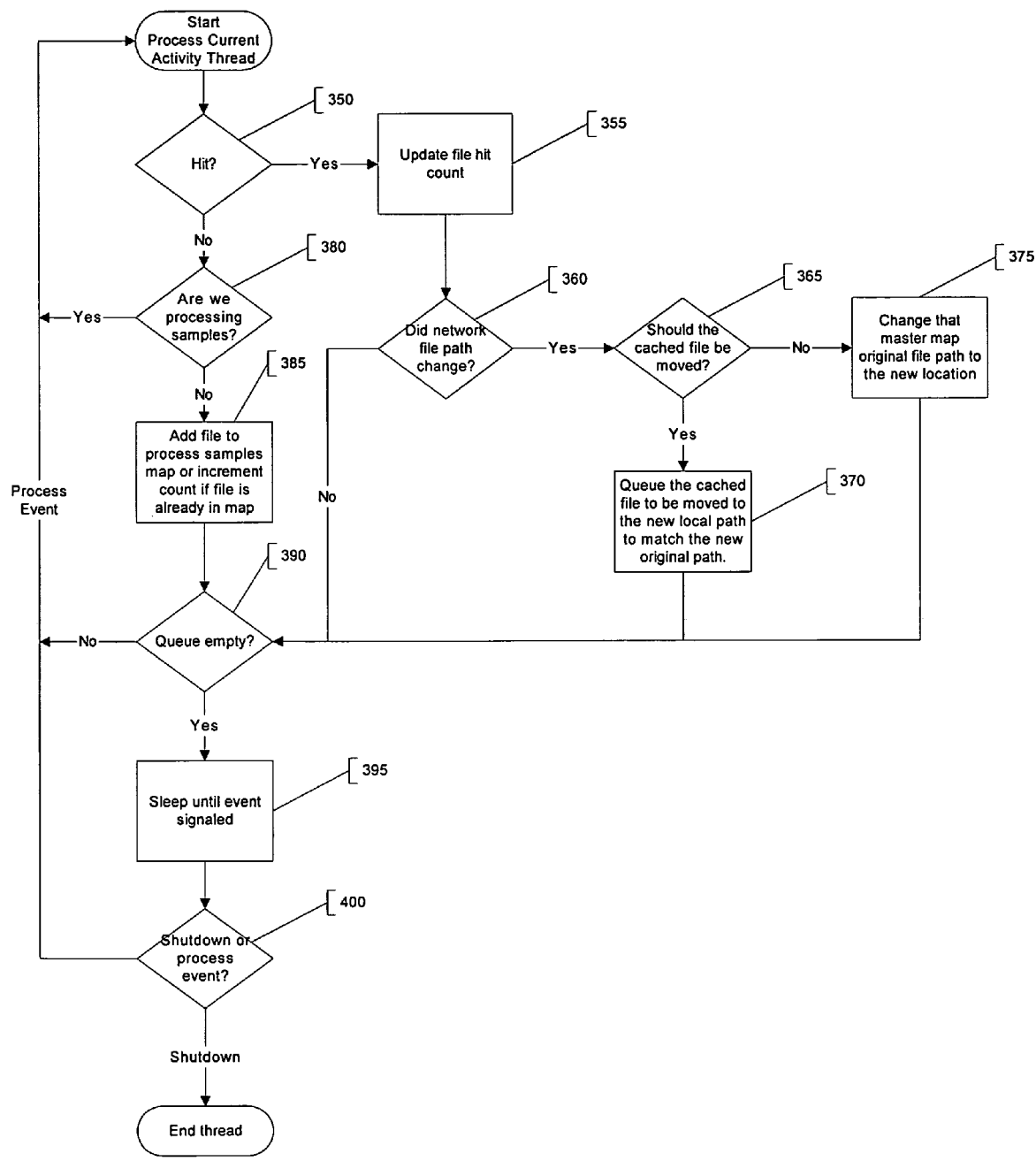

With reference to FIG. 3b, the current activity thread of the cache management component is responsible for monitoring current stream request activity and for tracking cache misses. In step 350, the process current activity thread determines whether there has been a hit or match for a requested stream that has been cached. If a hit has occurred, then the process updates the file hit count, in step 355, and determines whether the network file path has changed, in step 360. The purpose of updating the hit count is to determine, which files to delete when necessary. Additionally, a mechanism for physically moving the locally cached file so the cached file path closely resembles the path of the on the network share may be included. The originally cached file path preferably closely matches the network share file path when it is first cached. However, if the location of the file on the network share changes, the CacheManager component can leave the locally cached file in the original location or optionally move the cached location to match the network share location. If the network file path has not changed, then the process jumps to step 390 described below. If the network file path has changed, in step 365, the process determines whether or not the cached file should be moved. Thus function may be used in connection with an authentication component to determine what files are secure by examining the path. In the case where files are moved from non-secure to secure (or vice versa) locations, there is a need to also move the locally cached file so the path will indicate that the stream is secure. Generically speaking, this is done to keep the locally cached path closely matching the network share path. If the location of the file on the network share has not changed, then the original file path in the master map is changed to the new location, in step 375. If the cached file is to be moved, then, in step 370, the cached file is queued to the new local path to match the new original path.

With reference again to step 350, if there has not been a hit, then it is determined whether samples are being processed in step 380. A sample is a map of the miss requests with the number of requests received for each file requested for a sample interval. The CurrentActivityThread preferably builds the samples when the samples are not being processed. The sample processing sorts the samples and determines what should and can be cached and queues them to be cached by the FileRetrieverThread. If the samples are currently being processed, then the event is processed and the thread returns to the start. If, however, samples are not being processed, then the requested/missed file is added to the process samples map or, if the file is already in the map, the count is incremented in step 385. In step 390, the thread determines whether any events are queued. If there are events queued, then the event is process and the thread returns to the start. If the queue is empty, then the process sleeps until another event is signaled in step 395. When an event is signaled, in step 400, it is determined whether it is a shutdown signal or an event to be processed. In steps 355 and 385, each time a stream is requested, the process current activity thread in the cache management component increments the count of requests for that stream. The process sample thread works for a predefined sampling interval. Once the sampling interval is expired as in step 420 (described below), the cache management component analyzes the missed requests to the cache that occurred during the sampling interval to identify the streams that are to be cached locally.

In a preferred embodiment, this is accomplished by calculating the percentage of misses for each stream among the missed streams. In other words, by way of example only, if during a certain interval 100 requests four streams were counted as misses, and a particular stream accounted for 20 missed requests, then that stream would have a percentage of misses of 20%. The streams that contribute to a certain predefined percentage of misses are thus identified and cached to the streaming servers 25. In another implementation, network filers are weighted based on their efficiency and this weighted average is used in conjunction with the missed percentage to arrive at the files to be cached. In a preferred embodiment, it has been found that caching the top 15% of the missed streams results in a more efficient streaming media delivery system 10 in that the burden on the streaming servers 25 to both serve streams locally and from the filers 15 is balanced. Of course, persons of skill in the art would recognize that different predefined cache percentage thresholds may be utilized depending upon, for example, certain particular design considerations and anticipated demand, or the relative size of the various streams to be served.

Figure 4A:
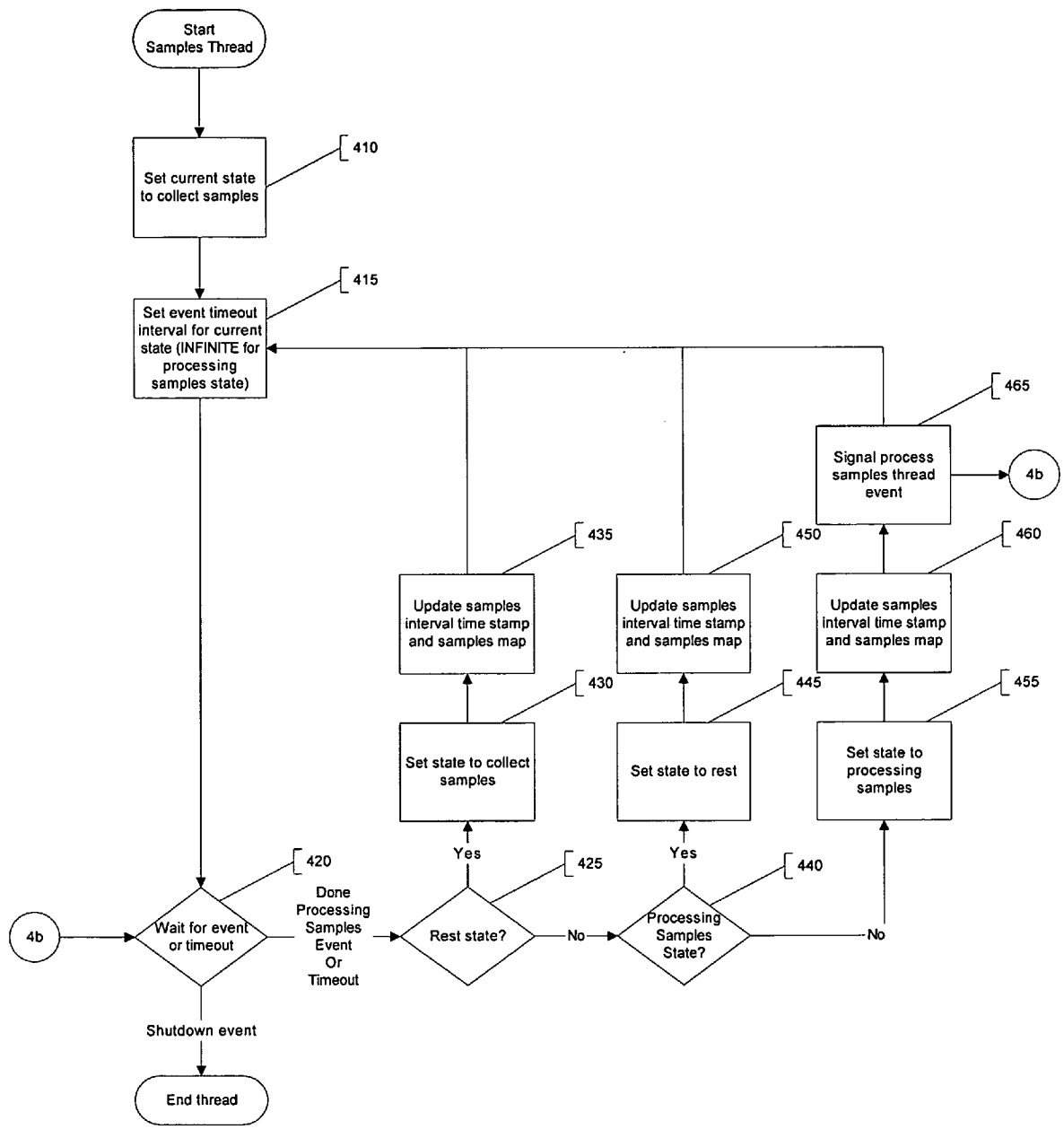
FIGS. 4*a*-4*c* depict an illustrative process flow for monitoring the demand of cached streaming media content and removing low demand content from the streaming media servers of the streaming media delivery system.
Figure 4B:
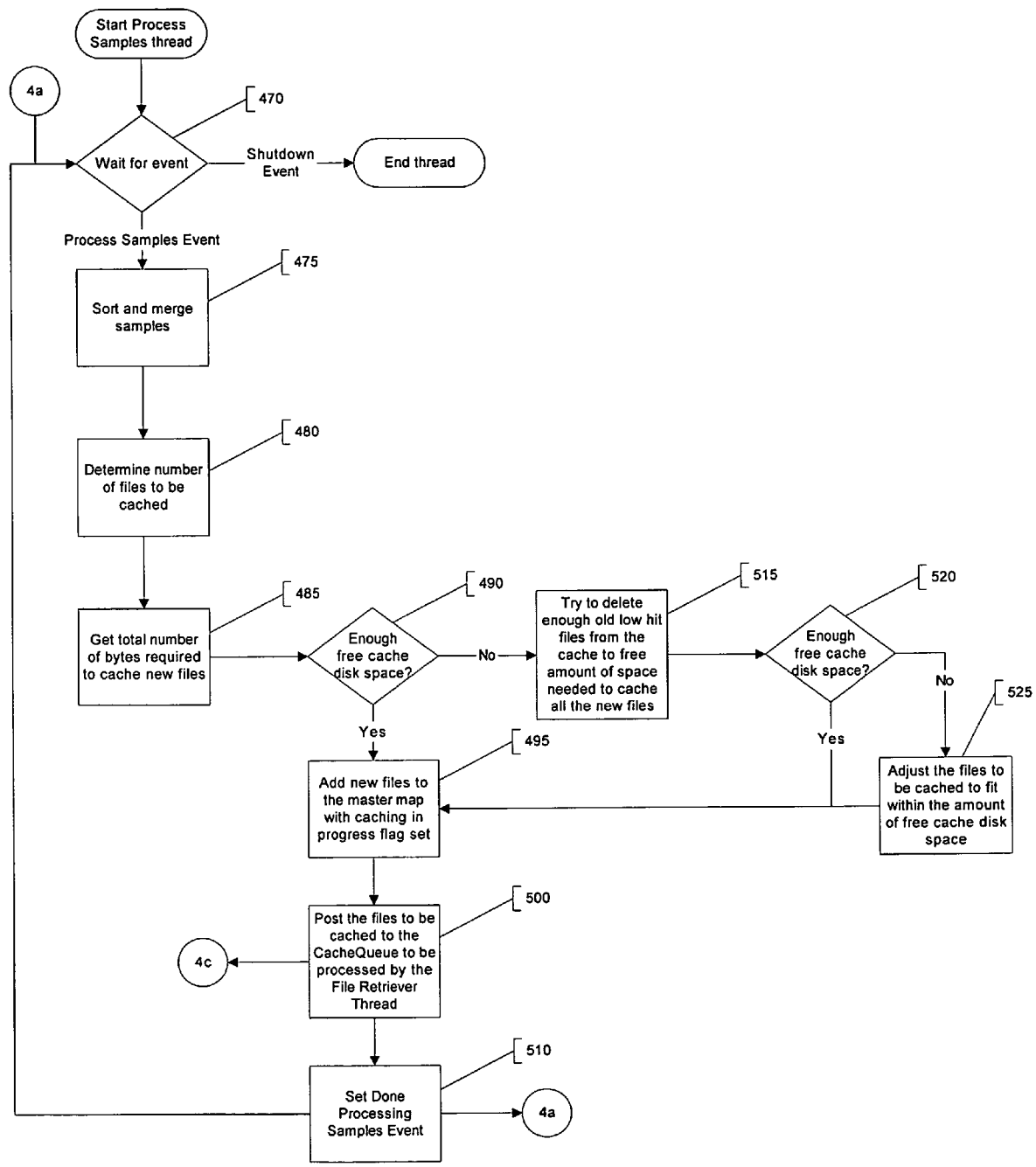
Figure 4C:
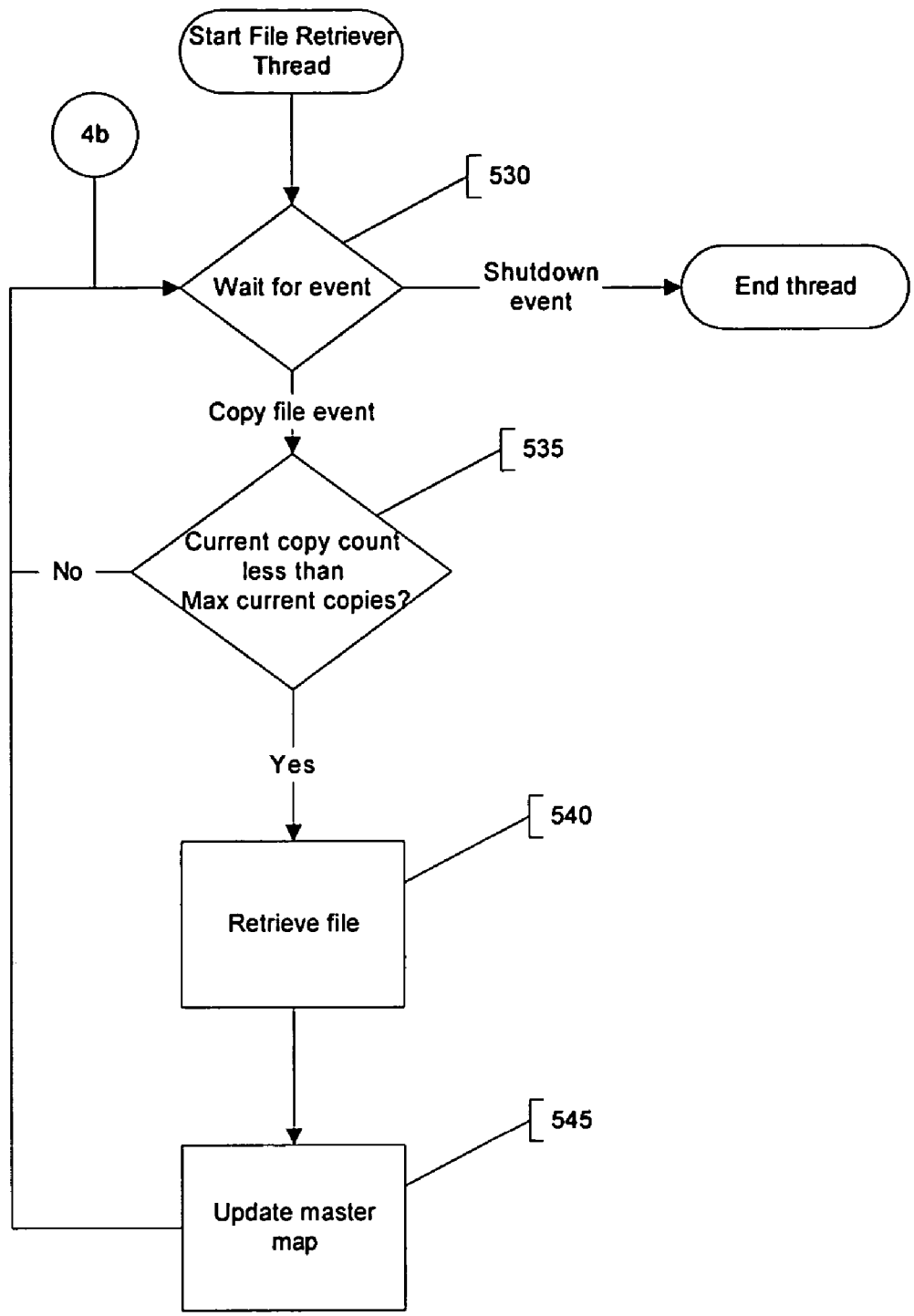

With reference now to FIGS. 4a through 4c, the processes of sampling requests, monitoring miss activity, and retrieving particular files to be cached will be shown and described. As discussed briefly above in connection with FIGS. 3a and 3b, miss activity is sampled for a specific time interval. This is referred to as the sampling period, which is based on the sampling performed during the sampling period time interval during which files to be cached are identified. Once the samples thread is begun, in step 410, the current state to collect samples is set. Next, in step 415, the event time out interval for the current state, which for the processing sample state is set to infinite, is set. In step 420 there is a decision point which waits for an event or times out in which case the event is shut down and the thread is ended. Assuming that a Done Processing Samples event is received or the wait timeout has expired the samples thread proceeds to determine, in step 425, whether the process is in the rest state. If the process is in the rest state, then the state is set to collect samples 430 and the sample interval time stamp and samples map is updated to reflect the collection of samples 435. At this point, the process returns to step 415. If the process is not in the rest state, then the process proceeds to step 440 in which it is determined whether the process is in the processing sample state. If it is, then the state is set to rest 445 and the samples interval time stamp and samples map is updated 450. Again, at this point, the process leaps back to 415. If the samples thread is neither in the rest state nor in the processing sample state, then the state is set to process samples in step 455. Next, in step 460, the samples interval time stamp and samples map is updated and in step 465 the process samples event thread, shown in FIG. 4b is signaled.

Referring now to FIG. 4b, the process samples thread waits for an event in step 470. If the event is a shut down event, then the thread is ended. If, however, the process samples event is received from the samples thread, then in step 475 the samples are sorted and merged. In step 480, the number of files to be cached is determined and, in step 485, the total number of bytes required to cache new files is obtained. At decision point 490, it is determined whether there is enough free disk space in the cache. If there is not enough free disk space, then in step 515 a sufficient number of old low hit files from the cache are deleted to free enough space for the new files to be cached. It would be understood by those skilled in the art that depending on the size of the cache and the number of files to be stored in the cache that it may not be feasible to free enough cache space. Thus, at decision point 520, it is determined whether the deletion process has in fact freed sufficient disk space. If the process has not, then in step 525, the files to be cached are adjusted such that the number of bytes required to cache any files will fit within the amount of free cache disk space. At this point the process loops back to step 495 in which the files are added to the master map and flagged for caching. It will also be understood that at decision point 490 if there is sufficient disk space then step 495 is performed directly. In step 500, the files to be cached are posted to the cache queue to be processed by the file retriever thread, as shown in FIG. 4c. In step 510, the processing samples event is set to the done state and the thread waits for another event in step 470. The samples thread resumes processing events in step 420 FIG. 4a.

With reference now to FIG. 4c, there is shown the step of the file retriever thread. In step 530, the thread waits for an event. If the event is a shut down event then the thread is ended. When a copy file event is received then in step 535 it is determined whether the current copy count is less than the maximum number of current copies. If not, then the process loops back to step 530 to wait for another event. If the current copy count is less than the maximum current copies, then in step 540 the file is retrieved. In the embodiment being discussed, the file is retrieved from the network filer. Next, in step 545, the master map is updated.

With reference now to FIG. 4b, in step 480, the process sample thread of cache management component identifies one or more streams for local copying to the streaming servers 25. In step 480, the identified stream(s) 15 is queued for copying to the streaming server 25. In step 540 of FIG. 4c, the copying process copies the streaming file, preferably using a buffer so that only a portion of the entire streaming file is copied at any given time. This reduces the burden on the network infrastructure as it is handling both serving streams to users and copying streams to the streaming servers. The buffer is preferably of a pre-configured size. In step 545 when the final copy process is completed, the data table, as shown in Table IIIA above, is updated with the stream ID and the appropriate cached path to the stream. The read only data Table III is updated based either on a predefined number of changes or when the specified files selected for caching are completely cached. Thus, when the particular streams are requested by a user they will be served directly from the streaming servers 25 and not from the filer 15.

In an alternative embodiment, RAMDisk 29 is used to cache higher demand streams that meet a second demand threshold while the streaming servers 25 cache the remaining high demand streams (i.e., those streams that meet the first demand threshold described above). Using RAMDisk 29 to cache higher demand streams creates a two tier stream caching arrangement that delivers the highest demand stream files from the faster RAMDisk 29. To determine which stream files will be cached on the RAMDisk, a second demand threshold is defined. By way of example, a first demand threshold for caching streaming files on the streaming servers may be 15% of missed files, while a second threshold for caching streaming files on the RAMDisk may be the top 7.5% of the highest hit cached files. Alternatively, the entire cache of streams may be maintained on the RAMDisk such that only a single tier of caching takes place. Files that are placed on the RAMDisk, however, preferably also exist on the primary hard disk on which they were cached. Any demand threshold for caching the streaming media files may be used as a matter of design choice.

To illustrate, Table IV below shows an example of a data table of streaming media file demand:

TABLE IV

| Stream ID | # of Requests | |
|---|---|---|
| 12345 | 275 | TOP 7.5% CACHED |
| 23456 | 223 | RAMDISK |
| 34567 | 219 | |
| 12345 | 275 | TOP 15.0% CACHED |
| 23456 | 223 | STREAMING SERVERS |
| 34567 | 219 | |
| 45678 | 195 | |
| 56789 | 152 | |
| 67890 | 111 | |
| 78901 | 87 | NOT CACHED |
| 89012 | 78 | |
| 90123 | 76 | |
| 01234 | 50 | |
| 10234 | 20 | |
| 10345 | 13 | |
| 10456 | 7 | |

Total # of Streams = 40 streams

Thus, as can be seen in Table IV above, the top 7.5% or top 3 streams of 40 are cached on the RAMDisk 29 and served therefrom to the end user computers 50, while the next 7.5% or streams 4-6 are cached on the hard disk 28. It will be understood by persons of skill in the art that the threshold levels described herein, while preferred, should not be interpreted to be exclusive of any other thresholds defined as a matter of design choice. Further, it will be understood that a two tier cache scheme need not be employed all streams meeting a defined demand threshold cached on the RAMDisk 29. The present invention is also not limited to two tiers and any number or combination hard disk and/or RAMDisks may be used to create more than two caching tiers.

With reference to FIG. 4b, the process samples thread of cache management component also determines when locally copied streaming files should be deleted from the streaming server to make room for other higher demand streams to be copied locally. In Step 490, the cache management component checks the disk space on the disk being used for the caching process. In step 515, if the disk space has reached a preconfigured constraint or percentage of use, then the cache management component checks the relative demands of all the streams stored locally on that streaming server. In step 495, if the disk space has not reached the pre-configured constraint value, then no files are deleted. The procedure will begin again at the next process sample thread interval if there are files to be cached. In the situation where the disk space has reached a certain constraint and the relative demand checked, the files with the least demand are deleted, in step 515, to make room for new files to be cached.

Cache File Cleanup

Preferred embodiments for performing maintenance and clean-up on the cached files will be described. In one case, cached files may need to be deleted when additional files are to be cached due to demand, as in step 515 of FIG. 4b. When the process sample thread of the caching component identifies files to cache, the thread determines whether there is sufficient disk space based on the disk space usage threshold to copy the files to be cached. If sufficient disk space is not present, the thread applies an algorithm to get a sorted list of the cached files that can be deleted. From that list the thread deletes only those files necessary to make room for the new files.

Operation of the algorithm to generate the sorted list will now be described. Preferably, cached files are preset to have a "lifetime" of 2 hours in the cache. The algorithm only considers files for deletion that are accessed prior to the 2 hour window from the current time.

In the Master Table, cached files preferably have at least the following attributes:

Sample—the time stamp interval period during which a particular file was cached.

Hit Count—the number of times a particular file was requested (or hit) during the sampling interval, which is reset for each successive sampling interval.

LiteStart—the time stamp this file is cached

The files are sorted by the algorithm based on least Sample Timestamp, least hit count and least life start time stamp. In this way the oldest and least requested files are deleted from the cache.

In a second case, cached files are maintained at regular, predefined intervals. A maintenance process thread of the cache manager component processes the files that were hit in the last pre-configured 60-second time interval. The maintenance process thread determines whether such files are in sync, in-terms of the size of the file and the modified time stamp of the file with the central filer from which the file was copied. If any of these parameters change or the file does not exist in either location, the maintenance thread marks that file for deletion. Also the maintenance thread at the start of the service under which caching component is running, synchronizes the information in the Master Table with the information on the cache disk and vice versa. If there is any discrepancy it cleans up the files and master details table too.

Thus, while there have been shown and described fundamental novel features of the invention as applied to the exemplary embodiments thereof, it will be understood that omissions and substitutions and changes in the form and details of the disclosed invention may be made by those skilled in the art without departing from the spirit of the invention. It is the intention, therefore, to be limited only as indicated by the scope of the claims appended hereto.

The invention claimed is:

1. A method comprising:
monitoring, by a streaming server in communication with a plurality of end users, demand for streaming media files to be served from the streaming server;
identifying, by the streaming server, at least one of the streaming media files to be cached when demand for the at least one of the streaming media files reaches a first pre-defined threshold;
copying said at least one of the streaming media files to a cache of the streaming server from a media storage device in communication with the streaming server and with a content management system from which content is passed to said media storage device over an internal local area network in a streaming media delivery system, the content management system receiving content from third party content providers, recording a publishing point for each item of received third party content, and storing the content on the media storage device;
wherein the streaming server is used to stream content to one or more users;
streaming said at least one of the streaming media files using the copy stored locally on the streaming server cache if the demand for the at least one of the streaming media files reaches the first pre-defined threshold;
when demand for at least one of the streaming media files reaches a second pre-defined threshold:
identifying the streaming media file to be cached on a RAMDisk;
copying the streaming media file to the RAMDisk; and
streaming the streaming media file from the RAMDisk to the end user computer.

2. The method of claim 1, wherein the step of monitoring demand further comprises:
in response to a request for one of the streaming media files, accessing a data table to determine whether the requested streaming media file is stored locally on the streaming server; and
increasing an incremental count each time the streaming media file is missed.

3. The method of claim 2, wherein the threshold is a percentage of streaming media files with the highest incremental count.

4. The method of claim 2, wherein the data table includes a stream identifier and stream path for each of the streaming media files stored locally on the streaming server.

5. The method of claim 4, wherein the request for one of the streaming media files includes the stream identifier for the requested streaming media file and wherein the step of accessing the data table to determine whether the requested streaming media file is stored locally on the streaming server further comprises:
attempting to look up the stream identifier included in the request.

6. The method of claim 5, further comprising:
accessing the requested streaming media file using the stream path associated with the stream identifier if the stream identifier is found in the data table; and
streaming the requested streaming media file to the end user from the streaming media server.

7. The method of claim 1, wherein the streaming media file is copied in buffered packets.

8. The method of claim 7, wherein the buffered packets are of a pre-configured size.

9. The method of claim 1, wherein the second pre-defined threshold is higher than the first pre-defined threshold.

10. The method of claim 9, wherein the first and second pre-defined thresholds are a percentage of the streaming media files stored on the media storage device.

11. The method of claim 10, wherein the first pre-defined threshold is the streaming media files with the top fifteen percent of requests and the second pre-defined threshold is the streaming media files with the top seven and one-half percent of misses.

12. A method comprising:
attempting to look up a stream path on a streaming server in a streaming media delivery system, in response to a request for streaming content to be served from a streaming server in communication with a plurality of end users;
increasing a miss tally stored on the streaming server if the stream path is not found;
copying the streaming content from a filer in communication with the streaming server and with a content management system from which content is passed to said filer in the streaming media delivery system over an internal local area network to a cache of the streaming server when the miss tally reaches a first pre-defined threshold, the content management system receiving content from third party content providers, recording a publishing point for each item of received third party content, and storing the content on the filer;
wherein the streaming server is used to stream content to one or more of the end users;
when demand for the content reaches the first pre-defined threshold, streaming the streaming content locally from the streaming server, in response to a subsequent request for the streaming content; and
when demand for the content reaches a second pre-defined threshold:
identifying the content to be cached on a RAMDisk;
copying the content to the RAMDisk; and
streaming the content from the RAMDisk to one or more of the end users.

13. The method of claim 12, wherein the stream path is stored on a data table on the streaming server and associated with a stream identifier, and the request for the streaming content includes an indication of the stream identifier and wherein the step of attempting to look up the stream path further comprises:
 accessing the data table; and
 attempting to look up the stream identifier identified by the indication in the request.

14. The method of claim 12, wherein the miss tally is increased by one each time the stream path cannot be found on the streaming server.

15. The method of claim 14, wherein the streaming content is copied in buffered packets.

16. The method of claim 14, wherein the buffered packets are of a pre-configured size.

17. The method of claim 12, wherein a plurality of streaming media files are stored in the filer and wherein the miss tally for each of the plurality of streaming media files is recorded in a tally data table.

18. The method of claim 17, further comprising monitoring the miss tally for each of the streaming media files and copying only those that meet the first pre-defined threshold.

19. The method of claim 18, wherein the first pre-defined threshold is the streaming media files having the highest tally.

20. The method of claim 19, wherein the pre-defined threshold is the streaming media files with the top fifteen percent of requests recorded in the miss tally.

21. The method of claim 12, wherein the second pre-defined threshold is higher than the first pre-defined threshold.

22. The method of claim 21, wherein the first and second pre-defined thresholds are a percentage of the streaming media files stored on the media storage device.

23. The method of claim 22, wherein the first pre-defined threshold is the streaming media tiles with the top fifteen percent of requests and the second pre-defined threshold is the streaming media files with the top seven and one-half percent of requests.

24. A system comprising:
 a filer storing one or more stream files, each of the stream files being identified by a stream identifier, the filer in communication with a content management system from which content is passed to said filer over an internal local area network, the content management system receiving content from third party content providers, recording a publishing point for each item of received third party content, and storing the content on the filer;
 a server capable of communication with the filer over the internal local area network to retrieve requested stream files and capable of communication with a plurality of end users,
 wherein the server is used to stream content to one or more of the end users;
 the server maintaining a first table of stream identifiers and associated network paths to the stream files, a second table of stream identifiers and associated local paths for each of the stream files cached on the server, and a third table including a count of requests for each of the stream files; and
 a RAMDisk capable of communication with the filer and the server,
 wherein, upon receipt of a request for one of the stream files from an end user computer, the server is configured to:
 monitor demand for the stream file;
 cache the stream file on the server when the demand for the stream file reaches a first pre-defined threshold;
 cache the stream file on the RAMDisk when the demand for the stream file reaches a second pre-defined threshold;
 access the second table to determine whether the requested one of the stream files is cached on the server or the RAMDisk;
 deliver the stream file to the end user computer from the RAMDisk if the stream file is cached thereon;
 deliver the stream file to the end user computer from the server if the stream file is cached thereon; and
 retrieve the stream file from the filer and deliver the stream file to the end user computer from the server if the stream file has not been cached.

25. The system of claim 24, wherein the demand is monitored by logging each request for the stream file in a data table.

26. The system of claim 24, wherein the first pre-defined threshold is the stream files with the top fifteen percent of requests.

27. The system of claim 24, wherein the second pre-defined threshold is the stream files with the top seven and one-half percent of requests.

28. A computer-readable storage medium tangibly comprising a software plug-in executable on a streaming server of a streaming media delivery system, the software plug-in comprising:
 a content mapping component for retrieving a path for cached streaming media files; and
 a cache management component for caching high demand streaming media files,
 wherein
 the cache management component is effective to retrieve streaming media files from a filer in the streaming media delivery system, said filer in communication with the streaming server and with a content management system from which content is passed to said filer over an internal local area network, for caching in the streaming server, the content management system receiving content from third party content providers, recording a publishing point for each item of received third party content, and storing the content on the filer;
 wherein the streaming server is used to stream content to one or more of the end users when demand for at least one of the streaming media files reaches a first pre-defined threshold;
 when demand for at least one of the streaming media files reaches a second pre-defined threshold,
 identify a streaming media file to be cached on a RAMDisk;
 copy the streaming media file to the RAMDisk; and
 stream the streaming media file from the RAMDisk to one or more of the end users.

29. The computer-readable storage medium of claim 28, wherein the content mapping component accesses a data table including a path for each of the cached streaming media files and the cache management component cached high demand streaming media files by accessing a data table including a ranking of the streaming media files by demand and caching only those streaming media files meeting a pre-defined threshold.

* * * * *